US009571341B1

(12) United States Patent
Kumar et al.

(10) Patent No.: US 9,571,341 B1
(45) Date of Patent: Feb. 14, 2017

(54) CLOCK GATING FOR SYSTEM-ON-CHIP ELEMENTS

(71) Applicant: NetSpeed Systems, San Jose, CA (US)

(72) Inventors: Sailesh Kumar, San Jose, CA (US); Sandip Das, San Francisco, CA (US); Poonacha Kongetira, Saratoga, CA (US)

(73) Assignee: NetSpeed Systems, San Jose, CA (US)

( * ) Notice: Subject to any disclaimer, the term of this patent is extended or adjusted under 35 U.S.C. 154(b) by 271 days.

(21) Appl. No.: 14/504,291

(22) Filed: Oct. 1, 2014

(51) Int. Cl.
| | |
|---|---|
| *G06F 17/50* | (2006.01) |
| *H04L 12/24* | (2006.01) |
| *H04L 12/751* | (2013.01) |
| *H04L 12/933* | (2013.01) |
| *H04L 12/803* | (2013.01) |

(52) U.S. Cl.
CPC ....... *H04L 41/0816* (2013.01); *H04L 41/0833* (2013.01); *H04L 45/08* (2013.01); *H04L 47/125* (2013.01); *H04L 49/109* (2013.01)

(58) Field of Classification Search
CPC .. G06F 17/5022; G06F 11/26; G06F 17/5045; G06F 17/504; G06F 17/5054; G06F 1/3203; G06F 1/324; G06F 1/3296; G06F 15/7867; G06F 17/5027; G06F 9/3867; G06F 9/3869; G06F 2217/86; G06F 11/3644
USPC .................................................. 716/110–118
See application file for complete search history.

(56) References Cited

U.S. PATENT DOCUMENTS

| | | | |
|---|---|---|---|
| 5,432,785 A | 7/1995 | Ahmed et al. | |
| 5,764,740 A | 6/1998 | Holender | |
| 5,991,308 A | 11/1999 | Fuhrmann et al. | |
| 6,003,029 A | 12/1999 | Agrawal et al. | |
| 6,249,902 B1 | 6/2001 | Igusa et al. | |
| 6,415,282 B1 | 7/2002 | Mukherjea et al. | |
| 6,925,627 B1 | 8/2005 | Longway et al. | |
| 7,065,730 B2 | 6/2006 | Alpert et al. | |
| 7,260,808 B1 * | 8/2007 | Pasqualini | G06F 17/5045 716/104 |
| 7,318,214 B1 | 1/2008 | Prasad et al. | |
| 7,590,959 B2 | 9/2009 | Tanaka | |
| 7,725,859 B1 | 5/2010 | Lenahan et al. | |
| 7,808,968 B1 | 10/2010 | Kalmanek, Jr. et al. | |

(Continued)

FOREIGN PATENT DOCUMENTS

| | | |
|---|---|---|
| CN | 103684961 A | 3/2014 |
| WO | 2014059024 A1 | 4/2014 |

OTHER PUBLICATIONS

Abts, D., et al., Age-Based Packet Arbitration in Large-Radix k-ary n-cubes, Supercomputing 2007 (SC07), Nov. 10-16, 2007, 11 pgs.

(Continued)

*Primary Examiner* — Binh Tat
(74) *Attorney, Agent, or Firm* — Procopio, Cory, Hargreaves & Savitch LLP

(57) ABSTRACT

An aspect of the present disclosure provides a hardware element in a Network on Chip (NoC), wherein the hardware element includes a clock gating circuit configures one or more neighboring hardware elements to activate before receiving new incoming data and to sleep after a defined number of cycles, wherein the defined number of cycles can be counted from a cycle having non-receipt of incoming data and/or having a clearance of all data within an input queue of a source hardware element.

16 Claims, 12 Drawing Sheets

(56) References Cited

U.S. PATENT DOCUMENTS

| | | | |
|---|---|---|---|
| 7,886,261 B1* | 2/2011 | Irving | H03K 19/17784 326/37 |
| 7,917,885 B2 | 3/2011 | Becker | |
| 8,050,256 B1 | 11/2011 | Bao et al. | |
| 8,059,551 B2 | 11/2011 | Milliken | |
| 8,099,757 B2 | 1/2012 | Riedle et al. | |
| 8,136,071 B2 | 3/2012 | Solomon | |
| 8,281,297 B2 | 10/2012 | Dasu et al. | |
| 8,312,402 B1 | 11/2012 | Okhmatovski et al. | |
| 8,448,102 B2 | 5/2013 | Kornachuk et al. | |
| 8,492,886 B2 | 7/2013 | Or-Bach et al. | |
| 8,541,819 B1 | 9/2013 | Or-Bach et al. | |
| 8,543,964 B2 | 9/2013 | Ge et al. | |
| 8,601,423 B1 | 12/2013 | Philip et al. | |
| 8,635,577 B2 | 1/2014 | Kazda et al. | |
| 8,667,439 B1 | 3/2014 | Kumar et al. | |
| 8,717,875 B2 | 5/2014 | Bejerano et al. | |
| 2002/0071392 A1 | 6/2002 | Grover et al. | |
| 2002/0073380 A1 | 6/2002 | Cooke et al. | |
| 2002/0095430 A1 | 7/2002 | Egilsson et al. | |
| 2004/0216072 A1 | 10/2004 | Alpert et al. | |
| 2005/0147081 A1 | 7/2005 | Acharya et al. | |
| 2006/0161875 A1 | 7/2006 | Rhee | |
| 2006/0268909 A1 | 11/2006 | Langevin et al. | |
| 2007/0088537 A1 | 4/2007 | Lertora et al. | |
| 2007/0118320 A1 | 5/2007 | Luo et al. | |
| 2007/0244676 A1 | 10/2007 | Shang et al. | |
| 2007/0256044 A1 | 11/2007 | Coryer et al. | |
| 2007/0267680 A1 | 11/2007 | Uchino et al. | |
| 2008/0072182 A1 | 3/2008 | He et al. | |
| 2008/0120129 A1 | 5/2008 | Seubert et al. | |
| 2009/0070726 A1 | 3/2009 | Mehrotra et al. | |
| 2009/0268677 A1 | 10/2009 | Chou et al. | |
| 2009/0313592 A1 | 12/2009 | Murali et al. | |
| 2010/0040162 A1 | 2/2010 | Suehiro | |
| 2011/0022754 A1 | 1/2011 | Cidon et al. | |
| 2011/0035523 A1 | 2/2011 | Feero et al. | |
| 2011/0060831 A1 | 3/2011 | Ishii et al. | |
| 2011/0072407 A1 | 3/2011 | Keinert et al. | |
| 2011/0154282 A1 | 6/2011 | Chang et al. | |
| 2011/0276937 A1 | 11/2011 | Waller | |
| 2012/0022841 A1 | 1/2012 | Appleyard | |
| 2012/0023473 A1 | 1/2012 | Brown et al. | |
| 2012/0026917 A1 | 2/2012 | Guo et al. | |
| 2012/0099475 A1 | 4/2012 | Tokuoka | |
| 2012/0110541 A1 | 5/2012 | Ge et al. | |
| 2012/0155250 A1 | 6/2012 | Carney et al. | |
| 2013/0028090 A1 | 1/2013 | Yamaguchi et al. | |
| 2013/0051397 A1 | 2/2013 | Guo et al. | |
| 2013/0080073 A1 | 3/2013 | de Corral | |
| 2013/0103369 A1 | 4/2013 | Huynh et al. | |
| 2013/0111242 A1* | 5/2013 | Heller | G06F 1/3206 713/323 |
| 2013/0151215 A1 | 6/2013 | Mustapha | |
| 2013/0159944 A1 | 6/2013 | Uno et al. | |
| 2013/0174113 A1 | 7/2013 | Lecler et al. | |
| 2013/0207801 A1 | 8/2013 | Barnes | |
| 2013/0219148 A1 | 8/2013 | Chen et al. | |
| 2013/0263068 A1 | 10/2013 | Cho et al. | |
| 2013/0326458 A1 | 12/2013 | Kazda et al. | |
| 2014/0068132 A1 | 3/2014 | Philip et al. | |
| 2014/0092740 A1 | 4/2014 | Wang et al. | |
| 2014/0098683 A1 | 4/2014 | Kumar et al. | |
| 2014/0115218 A1 | 4/2014 | Philip et al. | |
| 2014/0115298 A1 | 4/2014 | Philip et al. | |

OTHER PUBLICATIONS

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

International Search Report and Written Opinion for PCT/US2014/023625, Jul. 10, 2014, 9 pgs.

\* cited by examiner

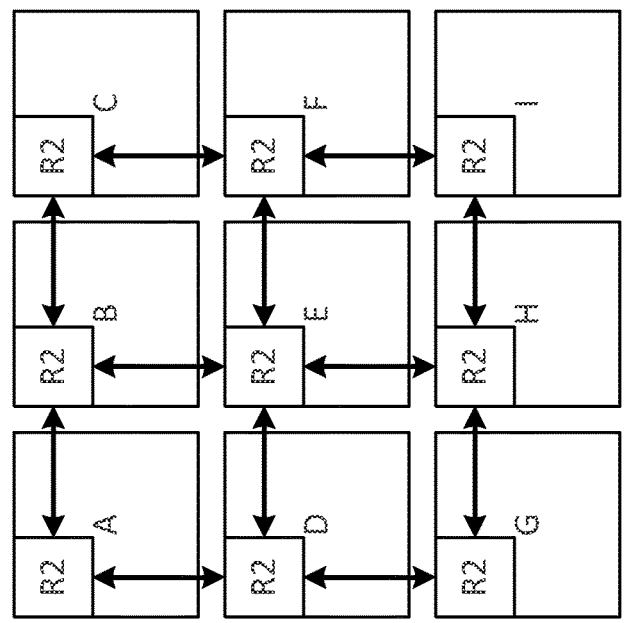
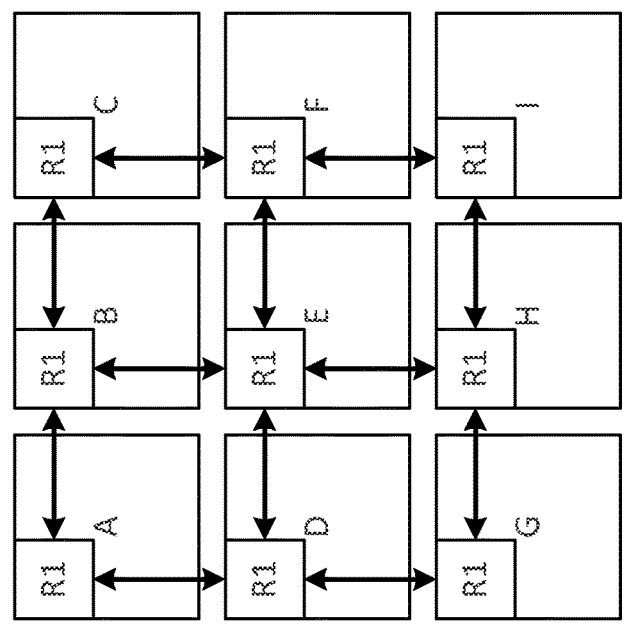
FIG. 3(a)

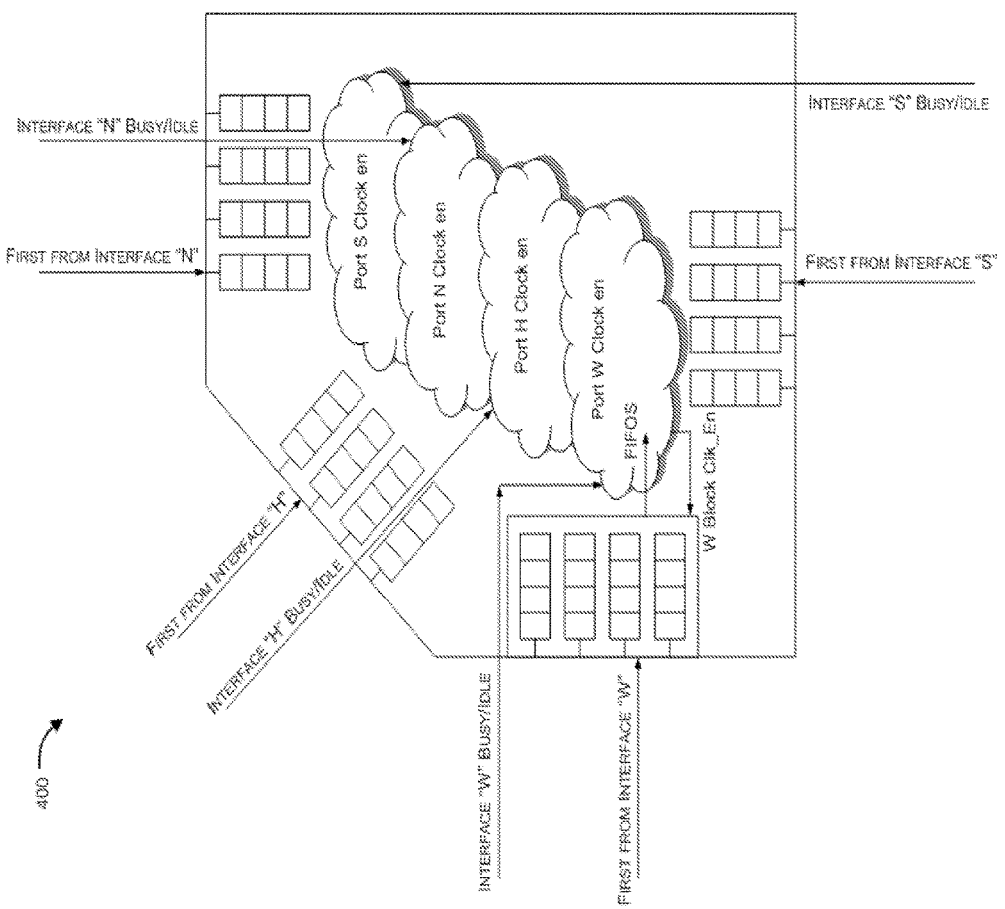

CLOCK GATING FOR SYSTEM-ON-CHIP ELEMENTS

BACKGROUND

Technical Field

Methods and example implementations described herein are generally directed to interconnect architecture, and more specifically, to clock gating for hardware elements on a System on Chip (SoC) and Network on Chip (NoC), interconnecting them Related Art The number of components on a chip is rapidly growing due to increasing levels of integration, system complexity, and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs).

VCs provide multiple independent paths to route packets, however they are time-multiplexed on the physical channels. A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic flows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements. With such a large variety of design choices, determining the right combination of routers, channels, and interconnections for a given system remains a challenge and time consuming manual process, often resulting in sub-optimal and inefficient designs.

System on Chips (SoCs) are becoming increasingly sophisticated, feature rich and high performance by integrating a growing number of standard processor cores, memory & I/O subsystems, and specialized acceleration IPs. To address this complexity, the Network-on-Chip (NoC) approach of connecting SoC components is gaining popularity. A NoC can provide connectivity to a plethora of components and interfaces and simultaneously enable rapid design closure by being automatically generated from a high level specification. The specification describes the interconnect requirements of the SoC in terms of connectivity, bandwidth and latency. In addition to this, information such as position of various components, protocol information, clocking and power domains, etc. may be supplied. A NoC compiler can then use this specification to automatically design a NoC for the SoC. A number of NoC compilers were introduced in the related art, which automatically synthesize a NoC based on the specification. In such designs, the synthesized NoC is simulated to evaluate performance under various operating conditions and to determine whether the specification(s) are met. This is necessary because NoCstyle interconnects are distributed systems and their dynamic performance characteristics under load are difficult to predict statically and can be very sensitive to a wide variety of parameters.

SUMMARY

Methods and example implementations described herein are generally directed to interconnect architecture, and more specifically, to clock gating for hardware elements of a System on Chip (SoC) and Network on Chip (NoC) interconnecting them.

An aspect of the present disclosure provides a hardware element in a Network on Chip (NoC) and a System on Chip (SoC), wherein the hardware element includes a clock gating circuit configures one or more neighboring hardware elements to activate before receiving new incoming data and to sleep after a defined number of cycles, wherein the defined number of cycles can be counted from a cycle having non-receipt of incoming data and having a clearance of all data within an input queue of a source hardware element. In an embodiment, the defined number of cycles can be set based on at least one of a predetermined number of cycles, say 3 or 4 cycles. In another embodiment, the defined number of cycles can be set based a self-learning process associated with one or more conditions of the system. In yet another embodiment, the number of cycles can be configured based on a hysteresis counter for reducing latency penalty due to clock gating and for saving power, wherein the hysteresis counter value can be configured to be set via self-learning based on network traffic and SoC and NoC conditions, and wherein the self-learning applies self-correction to the number of cycles. Any other process/attribute/factor can be incorporated for computing the number of cycles, post which the concerned hardware elements such as routers, bridges, can go to sleep.

Another aspect of the present disclosure provides a semiconductor device incorporating a Network on Chip (NoC) and a System on Chip (SoC), wherein the NoC and SoC includes a hardware element having a clock gating circuit configures one or more neighboring hardware elements to activate before receiving new incoming data and to sleep after a defined number of cycles, wherein the defined number of cycles can be counted from a cycle having non-receipt of incoming data and having a clearance of all data within an input queue of a source hardware element. In an embodiment, the defined number of cycles can be set based on at least one of a predetermined number of cycles, say 3 or 4 cycles. In another embodiment, the defined number of cycles can be set based a self-learning process associated with one or more conditions of the SoC and NoC. In yet another embodiment, the number of cycles can be configured based on a hysteresis counter for reducing latency penalty due to clock gating and for saving power, wherein the hysteresis counter value can be configured to be set via self-learning based on network traffic and SoC and NoC conditions, and wherein the self-learning applies self-correction to the number of cycles. Any other process/attribute/factor can be incorporated for computing the number of cycles, post which the concerned hardware elements such as routers, bridges, can go to sleep.

The foregoing and other objects, features and advantages of the example implementations will be apparent and the following more particular descriptions of example implementations as illustrated in the accompanying drawings wherein like reference numbers generally represent like parts.

BRIEF DESCRIPTION OF THE DRAWINGS

FIG. 3(a) illustrates an example of a related art two layer NoC interconnect.

FIG. 4 illustrates an exemplary router in accordance with an example implementation.

DETAILED DESCRIPTION

Figure 1A:
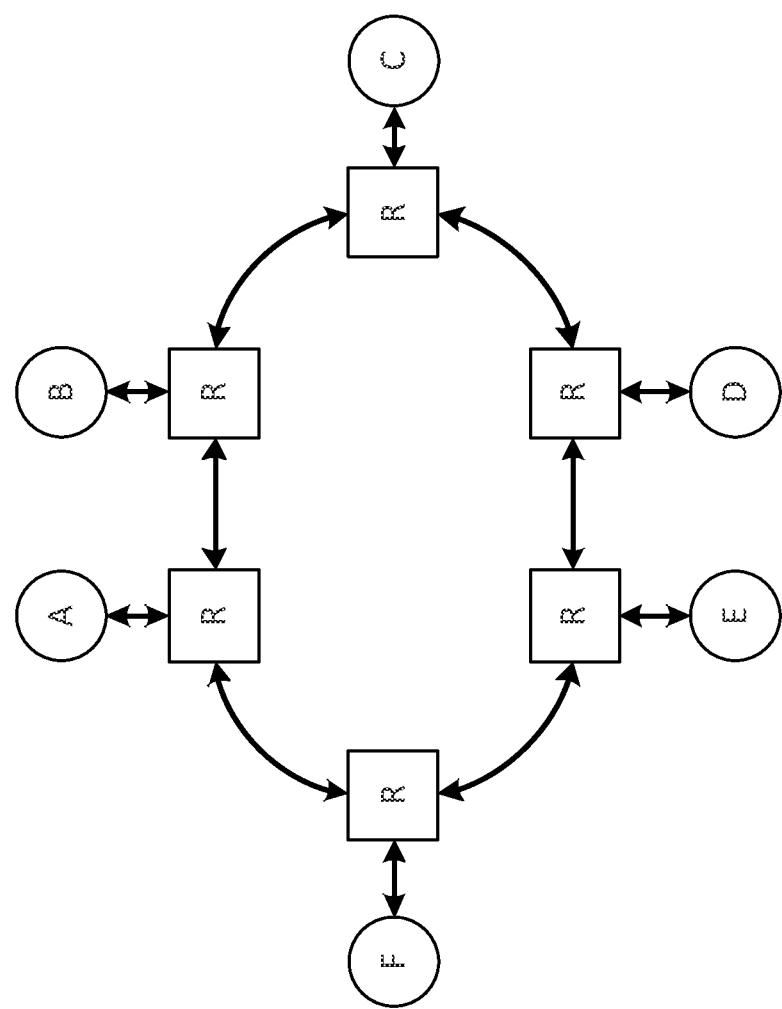
FIGS. 1(a), 1(b) 1(c) and 1(d) illustrate examples of Bidirectional ring, 2D Mesh, 2D Torus, and 3D Mesh NoC Topologies.
Figure 1B:
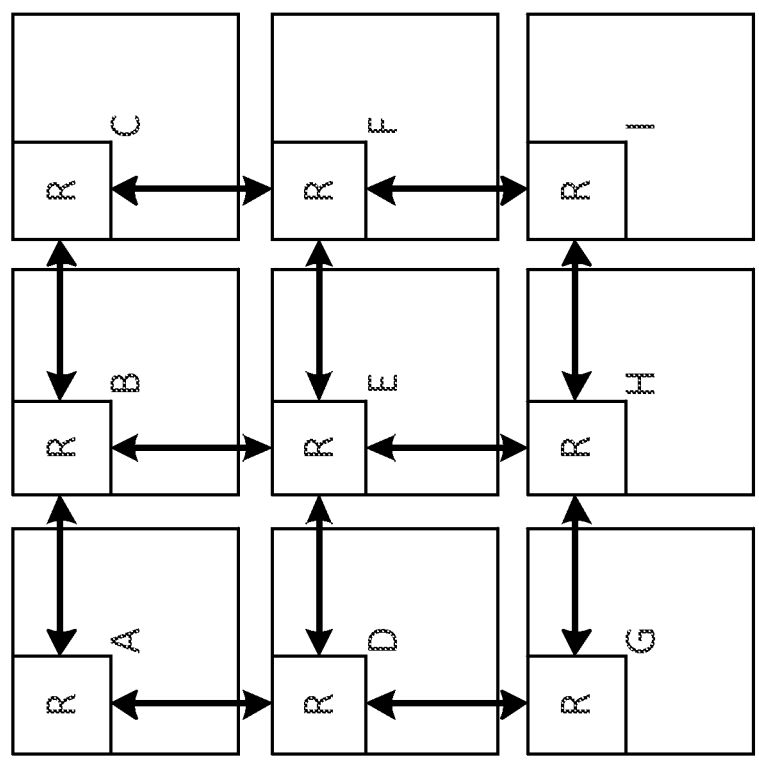
Figure 1C:
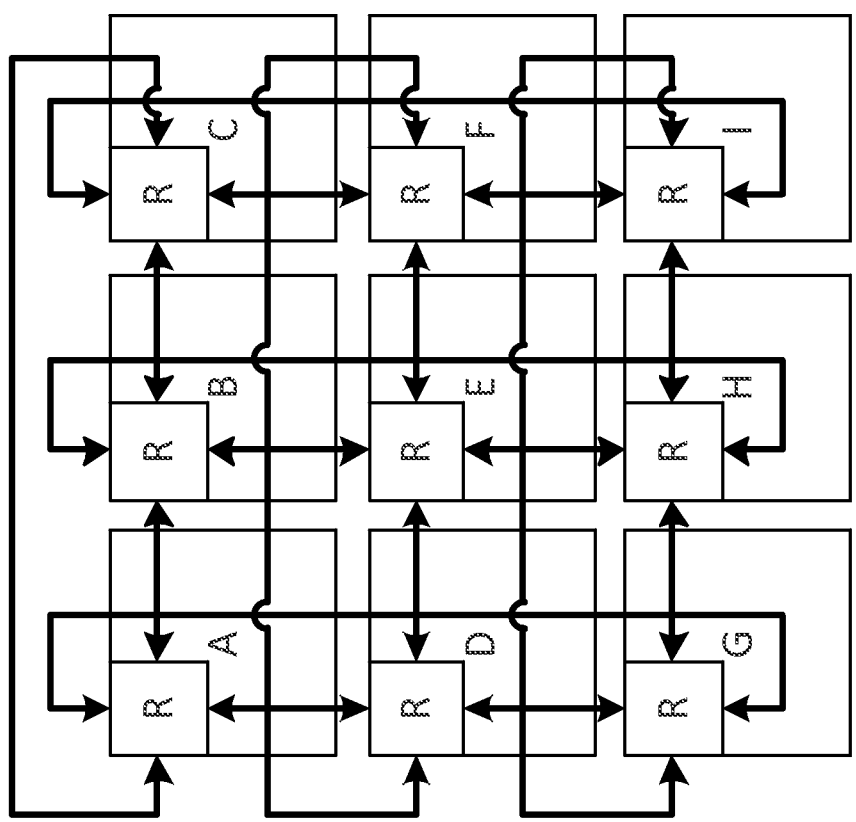
Figure 1D:
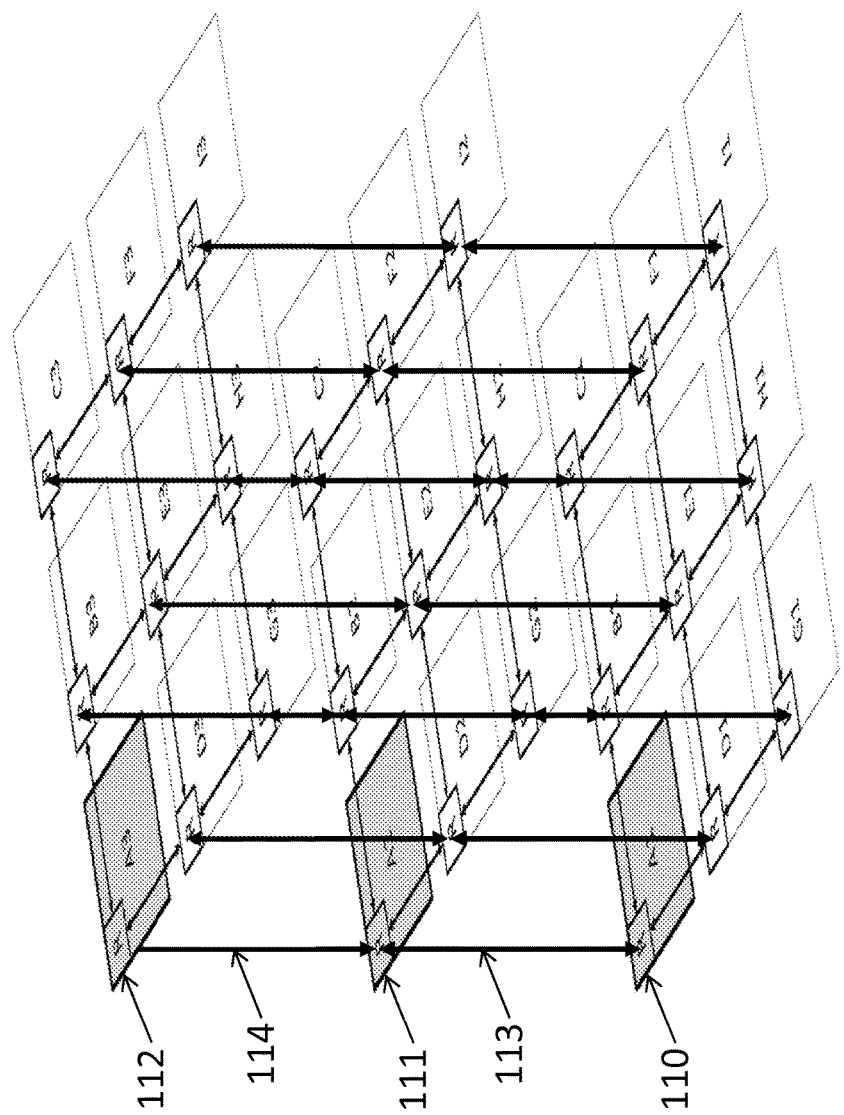
Figure 2A:
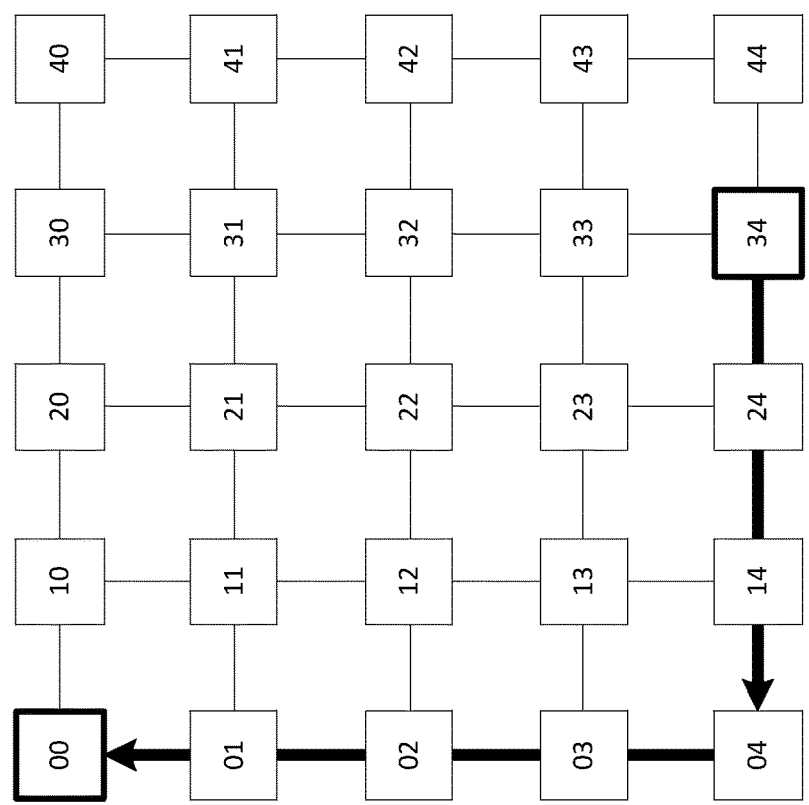
FIG. 2(a) illustrates an example of XY routing in a related art two dimensional mesh.
Figure 2B:
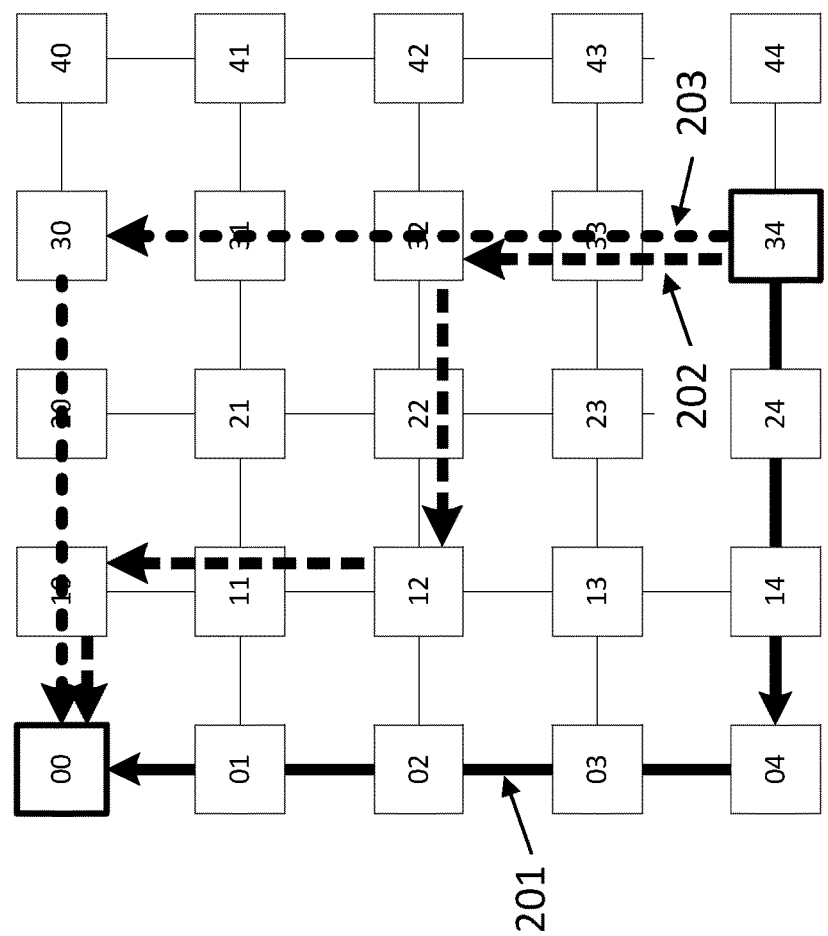
FIG. 2(b) illustrates three different routes between a source and destination nodes.
Figure 3B:
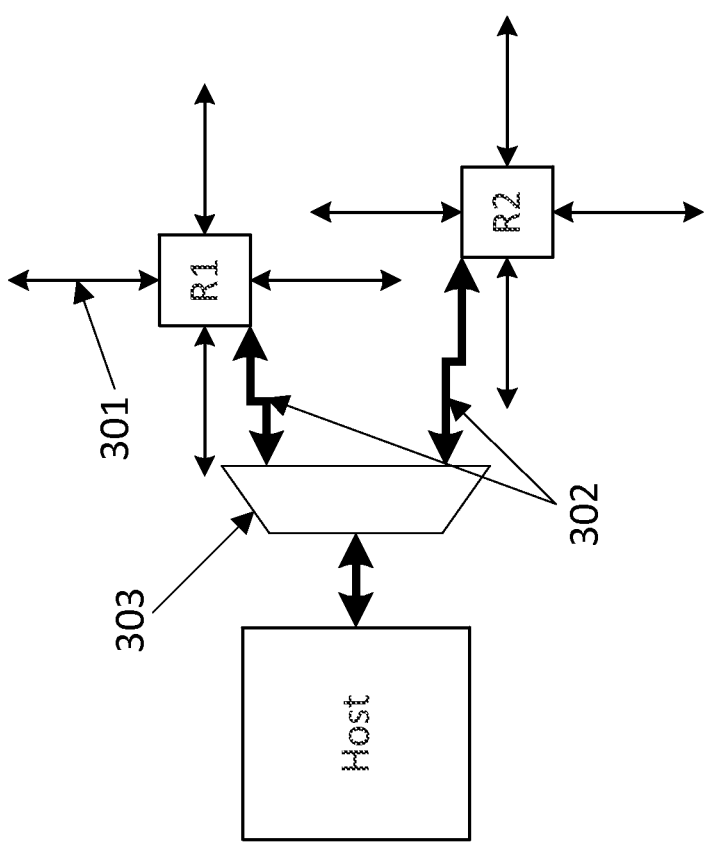
FIG. 3(b) illustrates the related art bridge logic between host and multiple NoC layers.

Although example implementations are described herein with respect to a NoC, the same implementations can be implemented in a SoC or in a system incorporating both a SoC and a NoC.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Example implementations involve clocked floating point operations (FLOPS) within the NoC. When there is no data on the activity side for a long time, opportunistically shutting off the clock may save power for the NoC. Hardware elements may also be opportunistically woken up.

An aspect of the present disclosure provides a hardware element in a Network on Chip (NoC), wherein the hardware element includes a clock gating circuit configured to opportunistically configure one or more neighboring hardware elements to activate before receiving new incoming data and to sleep after a defined number of cycles, wherein the defined number of cycles can be counted from a cycle having non-receipt of incoming data and having a clearance of all data within an input queue of a source hardware element. In an embodiment, the defined number of cycles can be set based on at least one of a predetermined number of cycles, say 3 or 4 cycles. In another embodiment, the defined number of cycles can be set based a self-learning process associated with one or more conditions of the NoC. In yet another embodiment, the number of cycles can be configured based on a hysteresis counter for reducing latency penalty due to clock gating and for saving power, wherein the hysteresis counter value can be configured to be set via self-learning based on network traffic and NoC conditions, and wherein the self-learning applies self-correction to the number of cycles. Any other process/attribute/factor can be incorporated for computing the number of cycles, post which the concerned hardware elements such as routers, bridges, can go to sleep.

In another aspect, the clock gating circuit can be configured to transmit advance notification to wake up one or more adjacent/neighboring hardware elements, wherein the notification can include at least one of a signal and a flit. The clock gating circuit can further be configured to extract information regarding a subsequent hop for incoming data, and transmit a wake notification only to a hardware element associated with the subsequent hop.

In another aspect, the clock gating circuit can be configured to factor in a delay for interface width transformation of incoming data to keep the advance notification signal asserted for a next hop hardware agent. The clock gating circuit can further be configured to process power down signals corresponding to one or more neighboring hardware elements and not assert advance notification for the corresponding one or more neighboring hardware elements. In yet another aspect, the clock gating circuit uses a window of predetermined number of cycles for information across synchronous and asynchronous clock boundaries with neighboring agents to stabilize, before making clock gating decisions.

In an aspect, the clock gating circuit can further be configured to be overridden based on a specification of a route on NoC, from system level. In an aspect, local override for clock gating circuit can be programmable through any of an internal register or a signal or a combination thereof. In another aspect, global override for clock gating circuit can also be provisioned through an external register or a signal.

In another embodiment, the proposed NoC can be configured in a semiconductor device such that the NoC has a plurality of hardware elements that are operatively coupled with each other. An objective of coarse clock gating of hardware elements in a NoC is to save power when the hardware elements are in idle condition for a long period of time. This is different from fine-grained clock gating (usually covered by synthesis logic), which controls clock gating on a cycle-by-cycle basis. Coarse-grained clock gating turns off all branches of the clock tree associated with the hardware element during any period of inactivity, saving power in un-clocked flops of the hardware element and also the power required to drive associated clock network. This present disclosure is directed to a scheme to adopt coarse-grained clock gating for hardware elements of a NoC such as a router, a bridge (e.g., streaming, AXI, etc.), pipeline stages, and so forth.

In example implementations, hardware elements may utilize a point-to-point signal, commonly referred to as a "Busy" signal such that when a hardware element is in a sleep state, all of its input ports are empty and the busy signal for neighboring elements are low. To control the busy signals, assuming that the hardware element has some information in its first in first out (FIFO) buffer that is bound for/to a sleeping element, the hardware element can be configured to extract information regarding the next hop and/or the next hardware element for the information in the buffer. The information in the buffer can be implemented, for example, in the form of flits or data packets. In an example implementation, flits can be aggregated for sleeping elements such that when a first flit comes into the buffer, busy signal can be sent to the sleeping hardware element to wake up the element.

In example implementations involving flits, flit ratios can be used to determine outstanding flits (e.g., 16 flit input and 4 flit output can mean 4 outstanding flits). Once the flits are sent, a provision in the register can be given to determine a value of how many cycles should be counted up before the hardware element is shut down. For example, assuming a flit is normally received every ten cycles, in an instance, the clock gating circuitry can be configured such that if no flit received in 20 cycles, the hardware element is shut down. The threshold can be set based on the traffic pattern and/or can be programmed in through a hysteresis counter.

When a busy signal is sent to turn on the hardware element, the hardware element may take one or two cycles to wake up. Thus, in an example implementation, a busy signal can be sent first, followed by the data that is to be sent to the hardware element.

In example implementations, a register override for clock gating may also be provided if there is pathway that must be maintained. A NoC route can be specified from system level to override clock gating of hardware elements with the purpose of not incurring latency penalty from clock gating. This can be achieved by setting clock gating override bit in local register within hardware elements on the specified route.

In an alternate embodiment, clock gating can be performed across all routers, bridges, among other NoC layers, within the same NoC layer or between different layers, Selective clock gating can also be based on design requirements, traffic pattern, specification, among other parameters.

In an example implementation, hardware elements may be shut down based on one or more conditions. An example condition can be that there are no transactions buffered or being processed internally and all credits have been returned from its neighboring block. Another example condition can be that there are no transactions buffered and inbound from a neighboring block.

Further, example implementations allow for over-riding or bypass of the coarse clock gating under one or more conditions, such as a system override to universally disable clock gating across all hardware elements, and a fast path override to selectively disable clock gating for certain NoC elements falling in fast paths. Additionally example implementations may also incorporate a System Clock Gate Enable signal to shut off all the NoC elements on a certain NoC Layer.

FIG. 4 illustrates an exemplary router architecture 400 in accordance with an example implementation. In an aspect, router 400 can include four directional (N, W, S, E) ports, one host port, and one Regbus port, although any number and types of ports may be utilized depending on the desired implementation, all such ports are within the scope of the present disclosure. Instead of using a clock gating circuit to wait for a no traffic condition on all ports to coarse clock gate the whole router off, example implementations can also coarse clock gate router such as router 400 on a port by port basis. For example, if all of the six ports reach a quiescent stage, the whole router can be turned off. Alternatively, each of these ports can also be selectively coarse clock gated (turned off) based on an empty condition of all of its associated input VC first in first outs (FIFOs) and an input signal indicating idle condition on neighboring element connected to that port.

In an example implementation, coarse clock gating of a router may be conducted based on self-idle condition on a particular port. To evaluate the condition, once all the input VC FIFOs associated with a given port of the router 400 are empty, self-idle signal for that port can be asserted high. For timing reasons, this self-idle signal may be implemented as an output of a flop. The FIFO occupancy evaluation can be accomplished in the previous cycle. The empty state of the input VC FIFOs also indicate that all credits for the NoC element (Router, Bridge) connected to that port have been returned, and therefore turning off the logic for that port won't cause any side effects for that neighboring NoC hardware element.

Example implementations may also conduct coarse clock gating of a router 400 based on a busy/idle condition of neighboring element connected to a particular port of the router 400. The coarse clock gating of a router 400 can be based on traffic information from each of its neighboring agents. The neighboring agents generate can be a busy signal on any of the input ports (N, E, W, S, H, and Regbus) of the target router 400, which intends to exercise coarse clock gating. If an interface busy signal is low, that interface is considered by the router to be in idle condition, which idle condition can then be used by the router to make two decisions; either to shut off clock and flops in the input block connected to that interface, or to shut off the entire router if the rest of interfaces are already in idle condition and there are no other transactions ongoing or pending inside the router.

In an aspect, adjacent hardware elements can send a busy signal for a predetermined number of cycles that can be calculated based on a predetermined number of cycles after the FIFO is evicted. In such an example implementation, the predetermined number of cycles can be set based on a hysteresis counter, which can be programmable, wherein the predetermination can be based on exact knowledge of traffic pattern injected into the NoC, which can be used to create a timing window for the hardware element, within which a new traffic is most likely to appear. If not, clock for the hardware element can be suppressed. In another example implementation, the predetermined number of cycles can be set based on a self-learning process. The self-learning process can be based on observation of actual network traffic and from subsequently applying self-correction for a more optimized value, leading to optimized network performance and power saving. The clock gating hardware can also initially use a random seed number as hysteresis count and can subsequently observe the network traffic arrival and burst signatures to dynamically update the hysteresis count based on self-learning.

According to one embodiment, as mentioned above, network self-learning can be incorporated to automatically configure settings for switching off or clock gating of one or more NoC element. Such self-learning can be configured to calculate a hysteresis counter that can decrement on every cycle on which there is no counter activity. Upon sensing a busy signal, the hysteresis counter value can be incremented by adding some value to it. Observation of network traffic and subsequent self-learning can be used by the clock gating circuit to assert and de-assert clock gating. Timely assertion of clock gating can help save power whereas the de-assertion of clock gating can help reduce/eliminate clock-gating penalty.

According to one embodiment, clock gating circuit can be configured to maintain two hysteresis registers, namely a clock gating assertion hysteresis register and a clock gating de-assertion hysteresis register, wherein the clock gating assertion hysteresis register can be configured to specify the number of clock cycles that the clock gating circuit should wait after the NoC element goes into idle state before asserting clock gating in order to save power consumption by NoC element being clock gated.

Clock gating de-assertion hysteresis register, on the other hand, can be configured to specify the number of clock cycles that the clock gating circuit should wait after the clock gating is done in order to perform de-assertion and save cycle penalty. In an aspect, if this "the number of clock cycles" is set to 0, the clock gating circuit would not speculatively de-assert clock gating but rather wait for the actual flits to arrive to cause the idle to busy. In another aspect, clock gating de-assertion hysteresis register can only be set when the clock gating circuit detects uniformity and predictability of the arrival of flits, while the NoC element is in idle state.

In an example, for every 10 transitions from idle to busy state (caused by the arrival of a new flit), the user can specify the threshold for how many transitions need to be outside the "clock gating assertion" hysteresis window and thus result in power saving. If not specified, the default value can be set at 50%. Clock gating circuit of the present disclosure observe arrival time of a new flit for every 10 idle states, and based on the observations, the clock gating circuit can enumerate "for the given threshold, which of the 10 arrival times can be set as "clock gating assertion" hysteresis value. Therefore, for the next 10 transitions, a decision is made by the clock gating circuit to pick the right transition amongst the 10 as the next "clock gating assertion" hysteresis value. For subsequent transitions, a moving median of each next successive 10 transitions can be used to set the "clock gating assertion" hysteresis value. ☐For example, we can start with an initial seed of 100 clock cycles as hysteresis value for clock gating assertion and requirement that 50% of the clock cycles result in power saving. The clock gating circuit observes that the for next 10 idle to busy transitions, the arrival time of new flits are 50, 60, 70, 150, 80, 130, 90, 110, 60, 120 clock cycles. It can then set the hysteresis value as 85 for the next 10 transitions. For next 10 transitions, the arrival times could be 120, 110, 50, 60, 70, 85, 160, 95, 100, 40 clock cycles. The clock gating circuit can then set the hysteresis value for next 10 transitions as the moving median of current and last 10 transitions, which is (85+90)/2=87. Any other means for computation of the hysteresis value is completely within the scope of the present disclosure and present median-based computation is completely exemplary in nature.

Figure 5:
FIG. 5 illustrates an exemplary bridge in accordance with an example implementation.

FIG. 5 illustrates an example flow diagram 500 showing steps for computation of hysteresis value/counter for clock gating assertion in accordance with an embodiment of the present disclosure. At step 505, a random seed for "clock gating assertion" hysteresis value can be taken. At step 510, threshold number of idle to busy transitions that need to be outside the "clock gating assertion" hysteresis window can be identified/retrieved. At step 515, it is determined if clock gating circuit is in self-learning mode, wherein at step 520, in case the clock gating circuit is not in the self-learning mode as yet and therefore the process is under a cold-start, "clock gating assertion" hysteresis value can be chosen from the random seed. At step 525, on the other hand, in case the clock gating circuit is already in the self-learning mode (not a cold-start), the "clock gating assertion" hysteresis value can be picked based on median value between random seed value (current value) and last running median, and the computed "clock gating assertion" hysteresis value can be marked as current value.

At step 530, NoC element can be allowed to go idle, and at step 535, once the NoC element goes idle, the hysteresis counter can be started and clock gating can be asserted once the count reaches the "clock gating assertion" hysteresis value as computed in steps 520 or 525, whichever is applicable.

At step 540, arrival time of next flit can be observed each time after the NoC element goes idle and such time during which the NoC element is in sleep can be stored in a stack as "value". At step 545, it is checked as to whether the number of times that the NoC element has gone idle is equal to or greater than 10, wherein in case the number of times is equal to or greater than 10, the method moves back to step 530, else, the method moves to step 550, wherein, after the 10'th occurrence, the 10 stored "values" can be processed to select the value that meets the "clock gating assertion" hysteresis value as computed in steps 520 or 525, whichever is applicable. At step 555, it can be determined, if the process is a cold-start, wherein, at 560, if the process is a cold-start, value that meets the "clock gating assertion" hysteresis value can be stored as running median of the "clock gating assertion" hysteresis value, else, if the process is not a cold-start, at step 565, median can be computed between the value that meets the "clock gating assertion" hysteresis value and the last running median of "clock gating assertion" hysteresis value, and the value is stored as running median of "clock gating assertion" hysteresis value. The method can then move back to step 515.

In an embodiment, second hysteresis register with "clock gating de-assertion" value can also be supported. The clock gating circuit of the present disclosure can be configured to observe the network traffic pattern and try to detect regularity in successive arrival times of flits, within a certain user specified deviation or tolerance range. This can be done by storing 10 successive arrival times of new flits in a stack and comparing them with new arrival times. Once predictability of the arrival times is detected, the predicted value can be calculated and stored in "clock gating de-assertion" hysteresis counter. This value can then be used to speculatively de-assert clock gating. In an aspect, this can be especially useful for NoCs handling display traffics where the arrival times of a new burst of traffic is fixed and regular.

Figure 6:
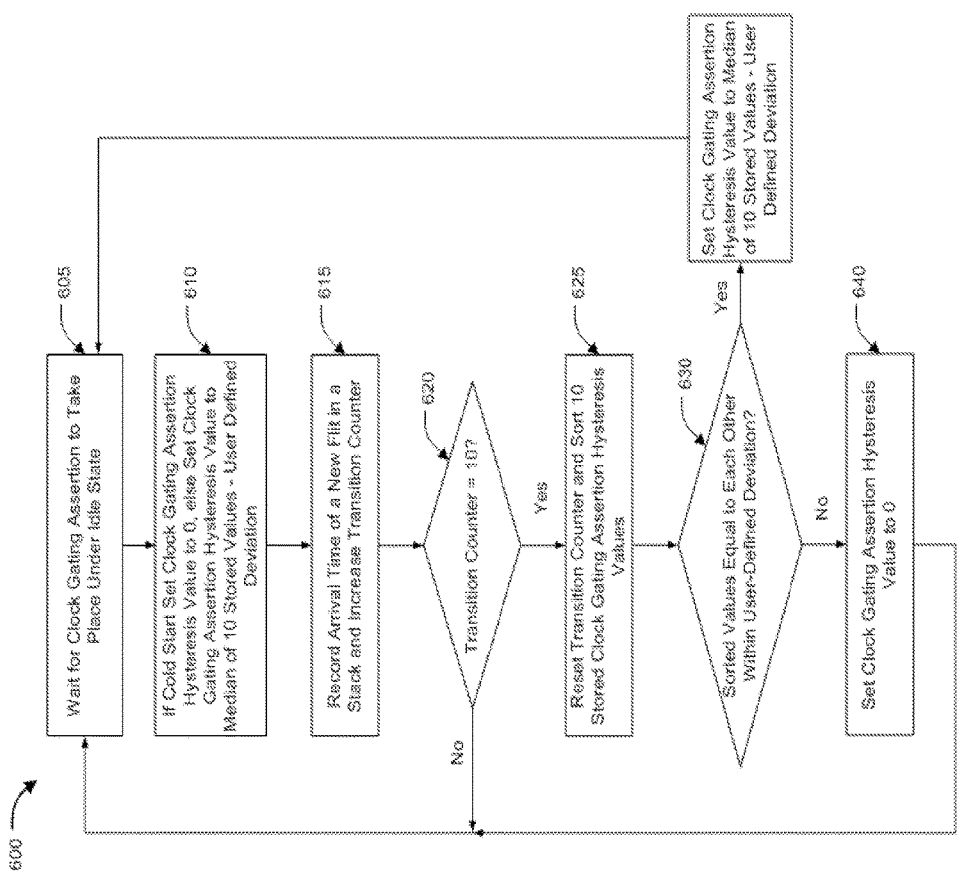
FIG. 6 illustrates an example flow diagram for computation of hysteresis value/counter for clock gating de-assertion in accordance with an example implementation.

FIG. 6 illustrates an example flow diagram 600 showing steps for computation of hysteresis value/counter for clock gating de-assertion in accordance with an embodiment of the present disclosure. At step 605, the method waits for clock gating assertion to take place under idle state. At step 610, assuming the process is a cold start, the "clock gating assertion" hysteresis value can be set at 0, else can be set at "median of 10 stored values—user specified deviation". At step 615, the method waits for a new flit and records the arrival time in a stack. At step 620, it is determined if the idle to busy transition is the 10'th transition occurrence, wherein if the transition is not the 10'th occurrence, the method can go to step 605, else at step 625, the 10 stored "clock gating assertion" hysteresis values can be sorted. At step 630, it is determined if the sorted values are equal to each other within a certain user-defined deviation, wherein at step 635, if it is determined that the sorted values are equal to each other within a certain user-defined deviation, the "clock gating assertion" hysteresis value can be set to "median of 10 stored values—user specified deviation", whereas, if it is determined that the sorted values are not equal to each other within a certain user-defined deviation, the "clock gating assertion" hysteresis value can be set to 0 at step 640. The method can then move back to step 605 to continue the process for clock gating de-assertion.

In an aspect, the neighboring agent can generate and transmit a dedicated busy signal corresponding to output port connected to a router. The busy signal indicates that the neighboring agent has transactions pending and ongoing for the router. The conditions for transitions on the busy signal can involve assertion and de-assertion. For the assertion condition, the neighboring agent may set up this transition at least one cycle ahead of the first flit that is sent to the destination router. For the de-assertion condition, neighboring agent may cause this transition after a fixed number of cycles once all the transactions for the destination router have been exhausted. The number of cycles can be programmed into a register residing within the neighboring agent.

Figure 7:
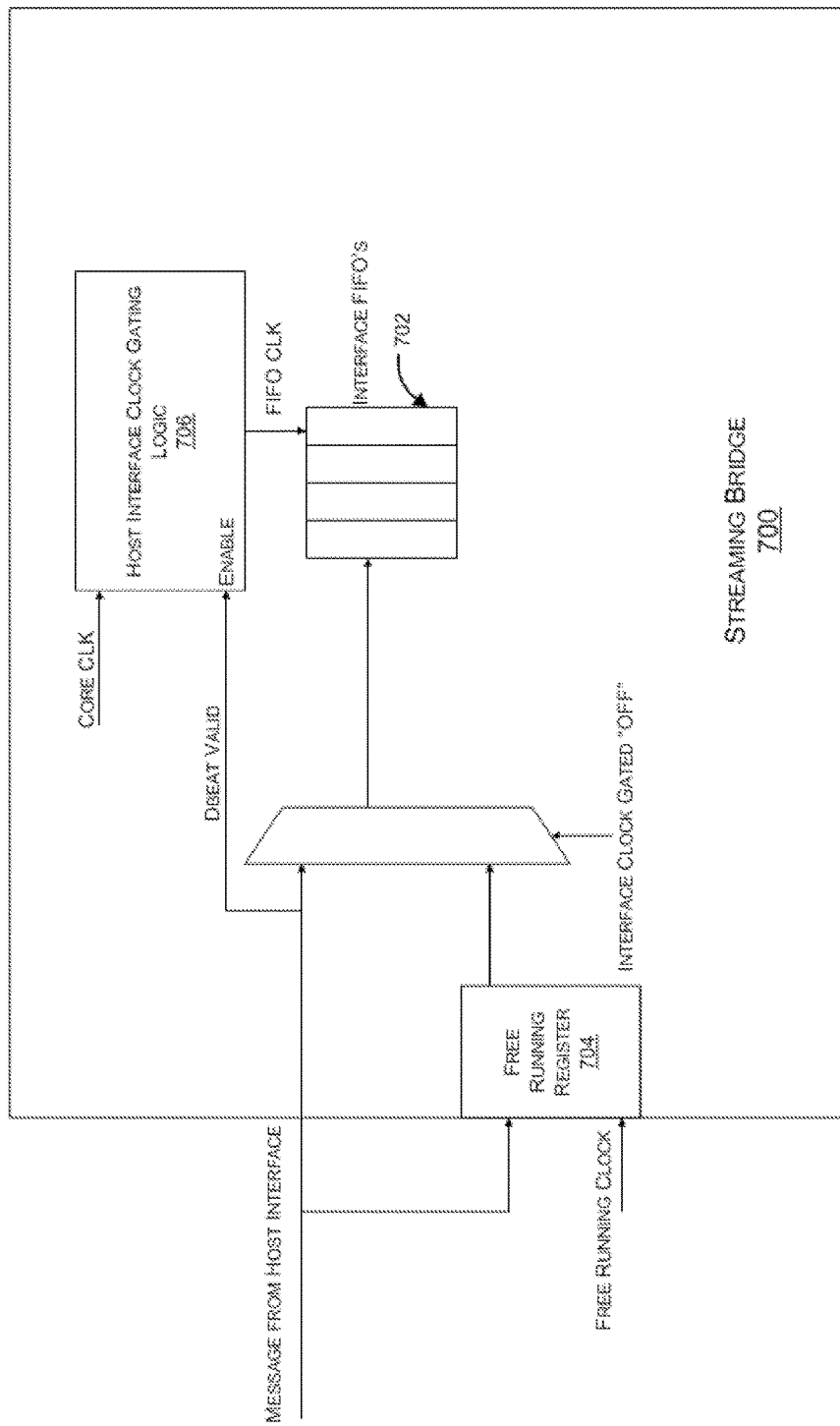
FIG. 7 illustrates an exemplary bridge in accordance with an example implementation.

FIG. 7 illustrates an exemplary bridge 700 in accordance with an example implementation. Although the example illustrated in FIG. 7 involves a streaming bridge 700, similar implementations may be applied to other bridges, such as AXI. All such NoC components/elements can be configured with such coarse clock gating and are within the scope of the instant disclosure. In an embodiment, while not shown herein, it is understood that the NoC architecture of the present disclosure may also include other components such as width converters, clock domain converters, and the like.

In an aspect, coarse clock gating in streaming bridge 700 can be conducted on per input interface (a, b, c, d) basis, wherein once the interface/input FIFOs 702 for a particular interface are empty, they can be clock gated off, if there is no activity on that input interface from the host side for a programmable number of cycles. The counter (per interface) may be configured to only start running after its input FIFOs 702 have drained out, and all associated credits have been returned to the host from that interface. The streaming bridge 700 can wake up and clock-enable that input interface block after it receives the wake up signal from the host. In an implementation, wake up signal for the FIFOs should be received at least one cycle ahead, before the actual message beats are written into the FIFOs. For this purpose, a conditional register 704 with a free running clock can be used to capture the first message beat. In the same cycle, the input FIFO can be clock enabled. The whole transmit block can be clock gated off, once all the host interface logic 706 has been clock gated off and all the credits from the NoC side have been returned.

In another aspect, the streaming bridge receive block (traffic from NoC) can be clock gated off based on a traffic condition on a layer-by-layer basis. This scheme is slightly different than clock gating scheme for the transmit block. For each NoC layer, there can be an associated coarse clock gating logic. Once the input virtual channel (VC) FIFOs for a particular NoC layer have been drained, the clock gating logic will wait for the busy signal from its attached router on that layer to be de-asserted. Once the condition is reached that the input VC FIFOS for that NoC layer X are empty (credits returned back to the router) and the busy signal have been de-asserted, the associated logic can be clock gated off. The whole Receive Block can be clock gated off, once all the input logic for all NoC Layers have been clock gated and all credits have been returned from the host to the Streaming Bridge.

In example implementations, system level clock gating may be applied to the NoC or the SoC system. In such example implementations, one or more hardware elements can be configured to have a clock input pin, which corresponds to the root of the clock distribution within the hardware element. System level clock gating allows a system clock enable pin to exist for each clock input on a bridge/router.

In example implementations, the system clock enable signal can be generated for each NoC element in various ways. In one example, the system clock signal can be generated and controlled by a system clock controller that is external to the NoC such that the signal is an external signal to NoC and is driven by the customer. The timing for the signal can be guaranteed by the customer, and thereby implemented according to the desired implementation of the customer.

In example implementations, hardware elements of the NoC or the SoC may be associated with a power domain. Each power domain may be associated with a separate clock. In such implementations, hardware elements across layers may be shut down and activated opportunistically through the system clock enable signal. In such a configuration, a system clock associated with a power domain may undergo a shutdown, thereby requiring all hardware elements within the power domain to shut down. When such an instruction is received, the hardware elements within the power domain can send a signal to adjacent nodes in other power domains indicating that a busy signal will not be accepted and that the hardware element will shut down.

In example implementations, the hardware elements can be defaulted to sleep if there is no busy signal or signal to wake the hardware element. Further, the hardware elements can be configured such that they will shut down after the busy signal is shut off, and after the FIFO is evicted. Individual ports of the hardware element may also be shut down in this manner.

In example implementations, the clock gating circuit can be overridden through the specification of a route from the system route. Such an implementation can preserve the hardware element from shutting down based on various conditions, such as performance metrics (e.g., bandwidth, latency, etc.) and so on. In such an implementation, a local override for the clock gating circuit can be provided to be programmable through an internal register or a signal. Further, a global override for the clock gating circuit can be provisioned through an external register or a signal. This is useful when clock gating feature is deemed superfluous or expensive for hardware elements belonging to a specific sub-system within the NoC.

In an example implementation, the clock gating circuit works across all clock ratios for synchronous and asynchronous clock boundaries with next hop nodes and bridges. The clock gating circuit waits for information across clock boundaries to resolve within a window of predetermined number of cycles, before making clock gating decisions. This window of predetermined cycles allows the clock gating circuit to act robustly across all clock ratios for synchronous and asynchronous clock boundaries.

Various embodiments include advantages over conventional solutions. As mentioned above, various embodiments can provide for a high degree of granularity in hardware gating, even while enjoying low latency for data. Also, greater power savings can result from the high degree of granularity in hardware gating.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

The methodologies described herein may be implemented by various components depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A hardware element in a Network on Chip (NoC) and/or System on Chip (SoC) comprising:
   a clock gating circuit that configures one or more neighboring hardware elements to activate before receiving new incoming data; and to configure the one or more neighboring hardware elements to sleep after a defined number of cycles, said defined number of cycles are counted from a cycle having non-receipt of incoming data and having a clearance of all data within an input queue of a source hardware element, the defined number of cycles being set based on at least one of a predetermined number of cycles and a calculation based on a self-learning process associated with one or more conditions of the at least one of the SoC and the NoC;
   wherein the hardware element is configured to be clock gated or clock disabled through one of a system level signal and a programmed register, upon which hardware element sends interrupt to its neighboring hardware elements to prevent them from sending messages to the hardware element.

2. The hardware element of claim 1, wherein the clock gating circuit is configured to transmit advance wake up notification to one or more adjacent hardware elements, the notification comprising at least one of a signal and a message.

3. The hardware element of claim 2, wherein the clock gating circuit is configured to extract information regarding a subsequent hop for incoming data, and transmit said wake up notification only to a hardware element associated with the subsequent hop.

4. The hardware element of claim 1, wherein the number of cycles is configured based on a hysteresis counter for reducing latency penalty due to clock gating and for saving power.

5. The hardware element of claim 4, wherein the hysteresis counter value is configured to be set via self-learning based on network traffic and at least one of the SoC and the NoC conditions, wherein the self-learning applies self-correction to the number of cycles.

6. The hardware element of claim 1, wherein the clock gating circuit uses a window of predetermined number of cycles for information across synchronous and asynchronous clock boundaries with neighboring agents to stabilize, before making clock gating decisions.

7. The hardware element of claim 1, wherein the clock gating circuit is configured to be overridden.

8. The hardware element of claim 7, wherein the override can be in form of a local override, and is implemented in form of a programmable internal register or a signal or a combination thereof.

9. The hardware element of claim 7, wherein the override can be in form of a global override for clock gating circuit provisioned through an external register or a signal.

10. A semiconductor device comprising a Network on Chip (NoC), said NoC comprising:
a clock gating circuit configured in a hardware element of said NoC, said clock gating circuit configures one or more neighboring hardware elements to activate before receiving new incoming data; and to configure the one or more neighboring hardware elements to sleep after a defined number of cycles, said defined number of cycles are counted from a cycle having non-receipt of incoming data and having a clearance of all data within an input queue of a source hardware element, the defined number of cycles being set based on at least one of a predetermined number of cycles and a calculation based on a self-learning process associated with one or more conditions of the NoC;
wherein the hardware element is configured to be clock gated or clock disabled through one of a system level signal and a programmed register, upon which hardware element sends interrupt to its neighboring hardware elements to prevent them from sending messages to the hardware element.

11. The semiconductor device of claim 10, wherein the clock gating circuit is configured to transmit advance wake up notification to one or more adjacent hardware elements, the notification comprising at least one of a signal and a flit.

12. The semiconductor device of claim 11, wherein the clock gating circuit is configured to extract information regarding a subsequent hop for incoming data, and transmit said wake up notification only to a hardware element associated with the subsequent hop.

13. The semiconductor device of claim 10, wherein the number of cycles is configured based on a hysteresis counter for reducing latency penalty due to clock gating and for saving power.

14. The semiconductor device of claim 13, wherein the hysteresis counter value is configured to be set via self-learning based on network traffic and NoC conditions, wherein the self-learning applies self-correction to the number of cycles.

15. The semiconductor device of claim 10, wherein the clock gating circuit uses a window of predetermined number of cycles for information across synchronous and asynchronous clock boundaries with neighboring agents to stabilize, before making clock gating decisions.

16. The semiconductor device of claim 10, wherein the clock gating circuit is configured to be overridden based on a specification of a route on NoC, from system level.

* * * * *